United States Patent
Liu et al.

(10) Patent No.: US 9,032,285 B2
(45) Date of Patent: May 12, 2015

(54) SELECTIVE CONTENT EXTRACTION

(75) Inventors: Sam Liu, Mountain View, CA (US);
Parag Joshi, Los Gatos, CA (US);
Yuhong Xiong, Mountain View, CA (US); Clayton Atkins, Mountain View, CA (US); Jerry Liu, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/378,153

(22) PCT Filed: Jun. 30, 2009

(86) PCT No.: PCT/US2009/049298
§ 371 (c)(1),
(2), (4) Date: Dec. 14, 2011

(87) PCT Pub. No.: WO2011/002456
PCT Pub. Date: Jan. 6, 2011

(65) Prior Publication Data
US 2012/0089903 A1    Apr. 12, 2012

(51) Int. Cl.
*G06F 17/00* (2006.01)
*G06F 17/30* (2006.01)

(52) U.S. Cl.
CPC ............... *G06F 17/30905* (2013.01)

(58) Field of Classification Search
CPC .............. G06F 17/30867; G06F 17/30905
USPC ............................... 715/234, 243, 273
See application file for complete search history.

(56) References Cited

U.S. PATENT DOCUMENTS

| | | | | |
|---|---|---|---|---|
| 6,029,182 A * | 2/2000 | Nehab et al. | | 715/205 |
| 6,360,227 B1 * | 3/2002 | Aggarwal et al. | | 1/1 |
| 7,085,999 B2 * | 8/2006 | Maeda et al. | | 715/236 |
| 8,156,419 B2 * | 4/2012 | Choudhary et al. | | 715/209 |
| 8,315,849 B1 * | 11/2012 | Gattani et al. | | 704/2 |
| 2001/0025304 A1 * | 9/2001 | Keith, Jr. | | 709/217 |
| 2001/0045965 A1 * | 11/2001 | Orbanes et al. | | 345/841 |
| 2001/0054049 A1 * | 12/2001 | Maeda et al. | | 707/517 |
| 2002/0003547 A1 * | 1/2002 | Wang et al. | | 345/727 |
| 2002/0004793 A1 * | 1/2002 | Keith, Jr. | | 707/1 |
| 2002/0010715 A1 * | 1/2002 | Chinn et al. | | 707/514 |
| 2002/0016801 A1 * | 2/2002 | Reiley et al. | | 707/523 |
| 2002/0093540 A1 * | 7/2002 | Mariani et al. | | 345/853 |

(Continued)

FOREIGN PATENT DOCUMENTS

| CN | 1592280 A | 3/2005 |
|---|---|---|
| CN | 1755675 A | 4/2006 |

(Continued)

OTHER PUBLICATIONS

Jyotika Prasad et al; CoreEx: Content Extraction from Online News Articles; Technical Report 2008-15: XP055064159; Retrieved from the Internet May 27, 2013; URL:http://ilpubs.stanford.edu:8090/832/1/2008-15.pdf.

*Primary Examiner* — Stephen Hong
*Assistant Examiner* — Marshon Robinson

(57) ABSTRACT

A method for extracting web content includes detecting, within a web page, a hierarchical structure that includes a plurality of nodes. Potential article nodes from the plurality of nodes are identified. The identified potential article node with a highest rank in the hierarchical structure is identified as an article node. Content is extracted from the article node.

9 Claims, 6 Drawing Sheets

(56) References Cited

U.S. PATENT DOCUMENTS

| | | |
|---|---|---|
| 2003/0120639 A1* | 6/2003 | Potok et al. ............... 707/3 |
| 2003/0229854 A1* | 12/2003 | Lemay .................. 715/513 |
| 2004/0015397 A1* | 1/2004 | Barry et al. ............. 705/14 |
| 2004/0103371 A1 | 5/2004 | Chen |
| 2004/0158799 A1* | 8/2004 | Breuel .................. 715/513 |
| 2005/0076000 A1 | 4/2005 | Sweet et al. |
| 2005/0177586 A1* | 8/2005 | Chen et al. ............. 707/100 |
| 2006/0282445 A1* | 12/2006 | Chen et al. ............. 707/100 |
| 2007/0260508 A1* | 11/2007 | Barry et al. ............ 705/14 |
| 2007/0288247 A1* | 12/2007 | Mackay .................... 705/1 |
| 2007/0293950 A1* | 12/2007 | Haugen et al. ........... 700/1 |
| 2008/0027707 A1* | 1/2008 | Stefik et al. ............. 704/9 |
| 2008/0107338 A1* | 5/2008 | Furmaniak et al. ...... 382/176 |
| 2008/0201118 A1 | 8/2008 | Luo |
| 2008/0307301 A1* | 12/2008 | Decker et al. ........... 715/241 |
| 2009/0044106 A1 | 2/2009 | Berkner et al. |
| 2009/0248707 A1* | 10/2009 | Mehta et al. ............ 707/100 |
| 2010/0191558 A1* | 7/2010 | Chickering et al. ........ 705/7 |
| 2011/0119571 A1* | 5/2011 | Decker et al. ........... 715/205 |
| 2011/0302510 A1* | 12/2011 | Harrison et al. ......... 715/760 |
| 2012/0084636 A1* | 4/2012 | Sengamedu et al. ..... 715/234 |

FOREIGN PATENT DOCUMENTS

| | | |
|---|---|---|
| JP | 11212751 A | 6/1999 |
| JP | 1999-203100 | 7/1999 |
| JP | 2002-032364 | 1/2002 |
| JP | 2002-229984 | 8/2002 |
| JP | 2002-229985 | 8/2002 |
| JP | 2004-086849 | 3/2004 |
| JP | 2005-189973 | 7/2005 |
| JP | 2006-235942 | 9/2006 |
| KR | 20070043386 A | 4/2007 |

* cited by examiner

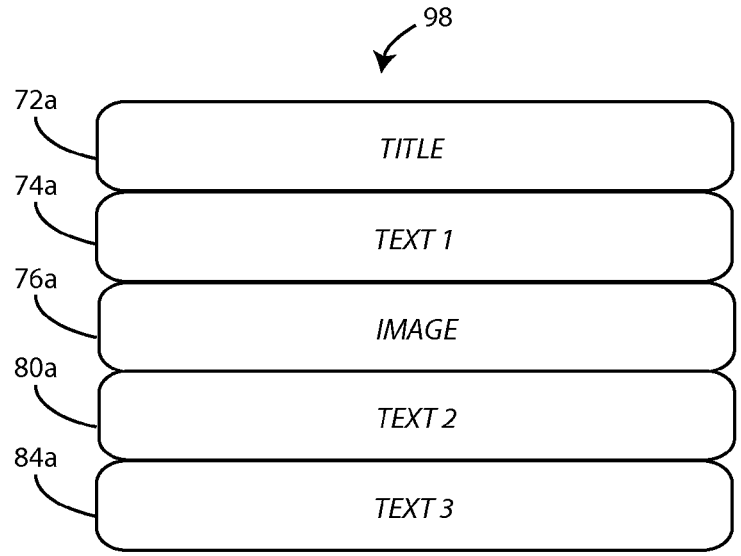
FIG. 7
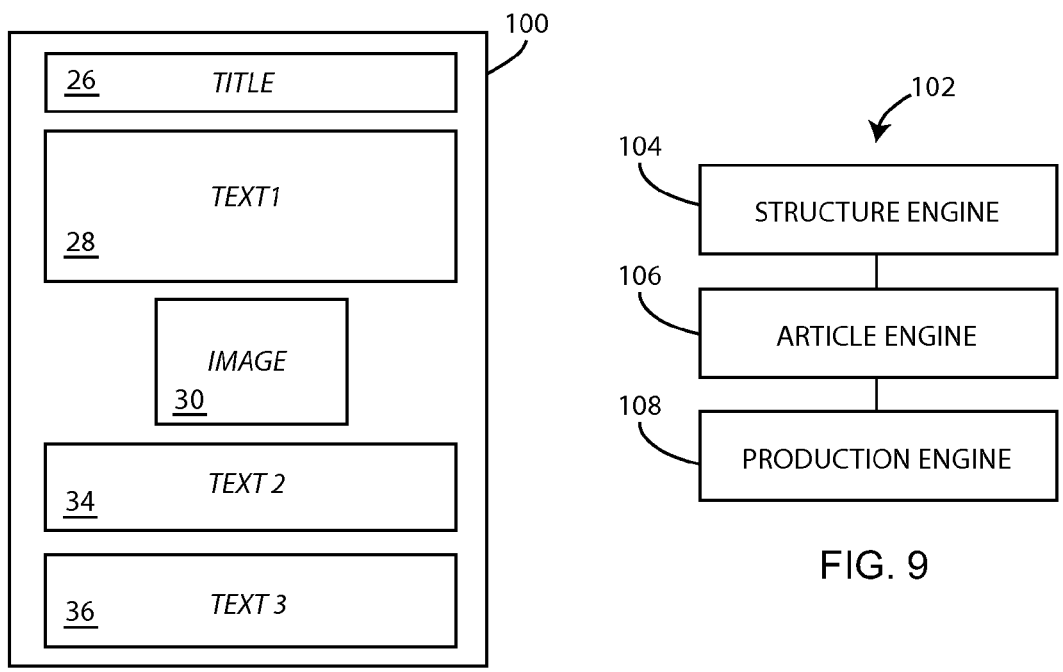
FIG. 8
FIG. 9

SELECTIVE CONTENT EXTRACTION

BACKGROUND

Web pages are often designed for screen display, not printing. In addition to a main article that can include text and images, web pages often include dynamically generated advertisements and other peripheral information. As a consequence, users desiring to print web pages are often frustrated with the results. A printed web page can have a cluttered appearance spanning several pages with the main article—interspersed with advertisements and other peripheral content—appearing on one page or split between two or more pages.

DRAWINGS

FIG. 7 is an exemplary depiction in which selected extracted content has been excluded according to an embodiment.

FIG. 8 is an exemplary depiction of produced content according to an embodiment.

FIG. 9 is an exemplary depiction of a selective content extraction system according to an embodiment.

DETAILED DESCRIPTION

Introduction

Various embodiments described below operate to selectively and automatically extract content from a web page or a series of related web pages. The extracted content can then be produced. As used herein, producing the extracted content can include, but is not limited to, printing, displaying, communicating, and electronically storing.

In operation, a web page is examined to identify a hierarchical structure such as a DOM (Document Object Model). The nodes of the structure are examined to identify potential article nodes. In an example, potential article nodes are those nodes that include text of a quantity that exceeds a threshold. That threshold defines a certain number of characters or words. The potential article appearing first in the structure is identified as an article node. Content from the article node and sibling nodes at the same hierarchical level are extracted, merged, and produced. In some cases content, such as advertisements from the sibling nodes, is excluded.

Web Content

Web content can be used to convey information to a user. That information includes article content the user requested as well as peripheral content such as web site identification, links, and miscellaneous advertisements. The article content can include information such as text and images related to a particular subject such as a news story, a recipe, or any other topic.

Figure 1:
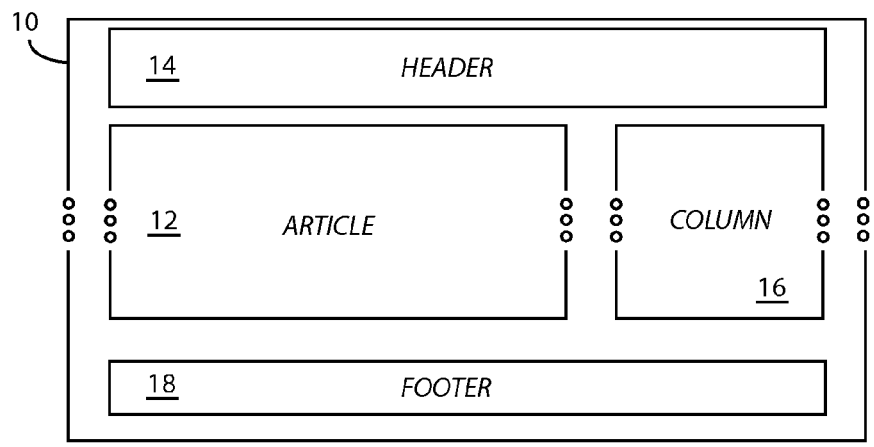
FIG. 1 is an exemplary depiction of a web page format.

FIG. 1 is an exemplary format for web page 10. While the format shown is exemplary, it includes common sections including article 12, header 14, column 16, and footer 18. Article section 12 includes article content such as text and images related to a particular subject of interest. Examples include, but are not limited to, news stories, building plans, and recipes. It may also include inline advertisements and other peripheral content not directly related to the article content. Header 14 typically includes data identifying a web site, navigation links, and often a banner advertisement. Column 16 can include advertisements and links related or unrelated to the content of article section 14. Footer 18 can include data identifying the web site, navigation links for the site and advertisements.

Figure 2:
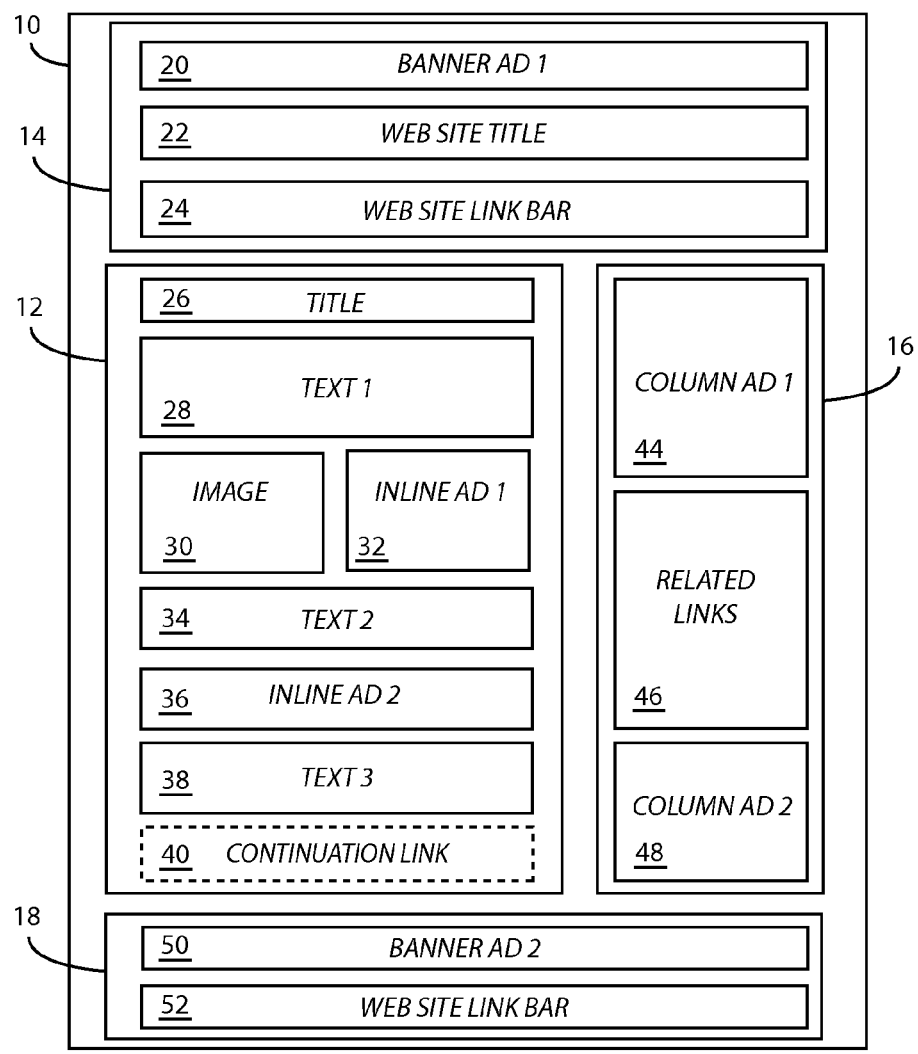
FIG. 2 is an exemplary depiction of the web page format of FIG. 1 with interspersed content.

FIG. 2 is a depiction of the web page 10 of FIG. 1 with exemplary content interspersed within each section 12-18. Header 14 is shown to include banner ad 20, web site title 22, and web site link bar 24. Banner ad 20 represents generally an image serving as a link to another web page. Web site title 22 represents content such as text and images identifying the web site. Web site link bar 24 represents a group of links for navigating the identified web site. Typically, none of the content 20, 22, and 24 is directly related to the topic of the article content of section 12.

Article section 12 is shown to include title 26, text 28, image 30 inline ad 32, text 34, inline ad 36, text 38, and, in some cases, continuation link 40. Title 26 represents a title of the article content. Text 28, 34, and 38 represent the main text of the article content. Image 30 represents a picture or other graphical content that is part of the article content. Inline ads 32 and 36 represent links to other websites and are not necessarily related to title 26, text 28, 24, and 38, and image 30, and are peripheral to the article content. The article content may span one or more additional web pages. In such a case, continuation link 40 is included. Continuation link 40 represents a link to a subsequent web page that contains additional article content and often times appears at the end of article section 12 and includes the word "next" or "1" and "2." That additional web page may or may not include another continuation link to yet another web page.

Column section 16 is shown to include column ad 44, related links 46, and column ad 48. Column ads 44 and 48 represent links to other websites and that may or may not be related to the topic of the article content. Related links 46 represent links to other web pages of the web sited that include other article content related to the article content of web page 10. Footer 18 is shown to include banner ad 50 and web site link bar 52. Banner ad 50 represents generally an image serving as a link to another web page. Web site link bar 52 represents a group of links for navigating the web site. Typically, none of the content 44-52 is directly related to the topic of the article content of section 12.

Content Extraction

Using web page 10 of FIG. 2 as an example, various embodiments discussed below with respect to FIGS. 3-8 operate to automatically extract the article content of section 12. Content from sections 14-18 is excluded. The extracted content can then be produced in a variety of manners such as printing, archiving, e-mailing, and the like. Of course web page 10 is used only as an example. The procedures discussed below work with a variety of web page formats.

Figure 3:
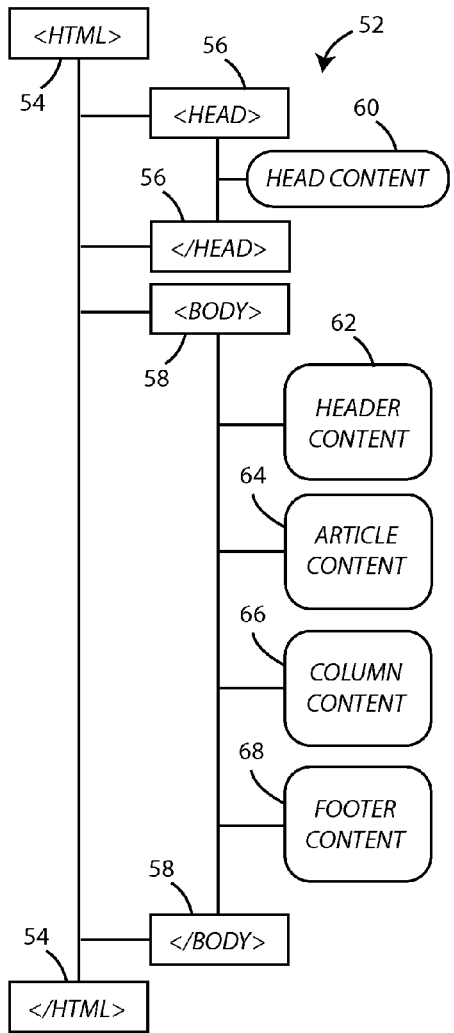
FIGS. 3-5 are exemplary depictions of hierarchical structures according to an embodiment.

Starting with FIG. 3, a hierarchical structure 52 of the subject web page is identified. Here the subject web page is web page 10 of FIG. 2. Such a hierarchical structure may be a DOM (Document Object Model) of the web page as depicted in FIG. 3 and expended upon in FIGS. 4 and 5. Structure 52 includes a plurality of hierarchically organized nodes. Node 54 is a root node that, in this example, identifies the web page language as HTML (Hyper-Text Mark-up Language). Note that, node 54 includes an opening tag "<HTML>" and a closing tag "</HTML>". For purposes of efficiency in referring to the figures, the two tags are referred to as a singular node 54. In other contexts, each tag could be identified as a separate node on structure 52.

Root node 54 includes or otherwise encompasses child nodes 56 and 58. With respect to one another, nodes 56 and 58 are siblings at the same hierarchical level within structure 52. Node 56 corresponds to a head tag of the HTML code and includes child node(s) identified as head content 60. Head content 60 represents one or more child nodes containing content that is not directly visible to a viewer of a web page. Head content 60 can include an external links to items such as style sheets and Javascript programs. Head content 60 also includes the title for the web page that appears in the top bar of a viewer's browser. Other elements may include a page description and key words.

Figure 4:
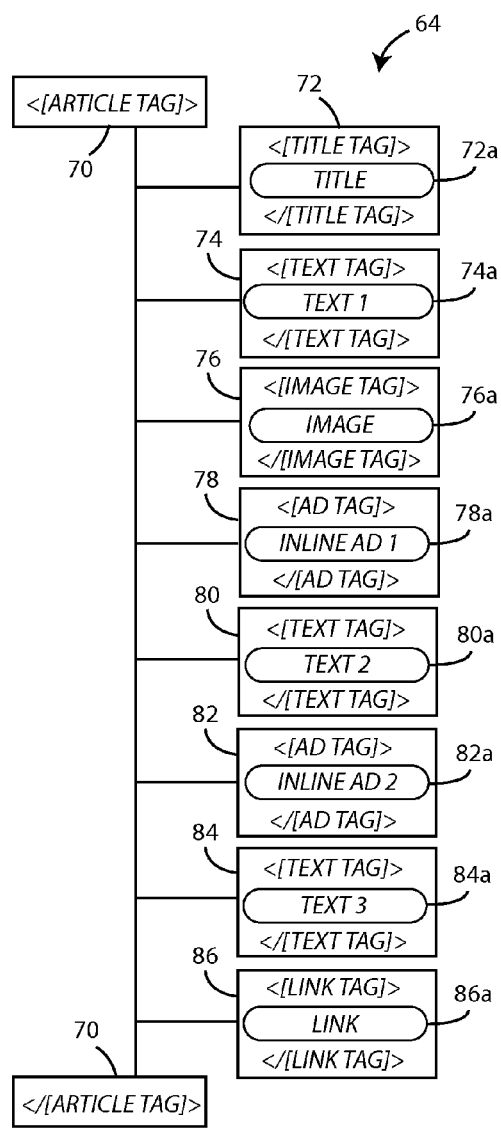
Figure 5:
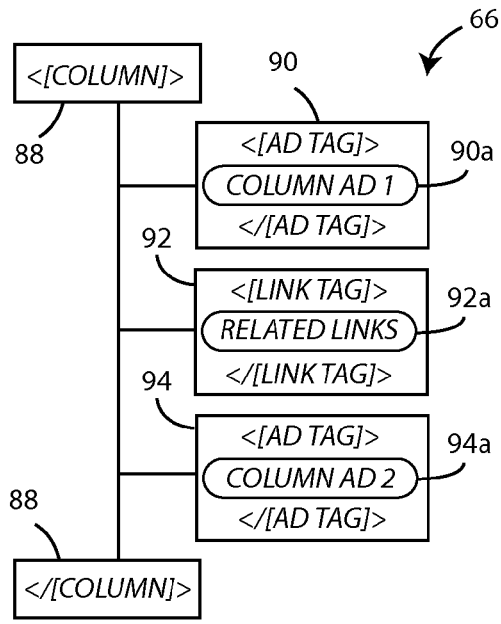

Node 58 corresponds to the body tags of the HTML code and includes or otherwise encompasses content 62-68 corresponding, in this example, to sections 12-18 of web page 10. In other words body content 62-68 represents the various child nodes defining the content that can be seen when the web page is viewed. Header content 62 represents the various nodes defining the content of header section 14 of web page 10. Article content 64, expanded upon with respect to FIG. 4, represents various nodes defining the content of article section 12 of web page 10. Column content 66, expanded upon with respect to FIG. 5, represents various nodes defining the content of column section 16 of web page 10. Footer content 68 represents various nodes defining the content of footer section 18 of web page 10.

Referring now to FIG. 4, article content 64 includes node 70 representing an opening and closing tag corresponding to article section 12 of web page 10. Exemplary tags could include, but are not limited to <div>, <p>, and <br>. Tag 70 includes or otherwise encompasses child nodes 72-86. With respect to FIG. 2:

Node 72 corresponds to tags and content 72a for title 26;
Node 74 corresponds to tags and content 74a for text 28;
Node 76 corresponds to tags and content 76a for image 30;
Node 78 corresponds to tags and content 78a for inline ad 32;
Node 80 corresponds to tags and content 80a for text 34;
Node 82 corresponds to tags and content 74a for inline ad 36;
Node 84 corresponds to tags and content 84a for text 38; and
Node 86 corresponds to tags and content 86a for link 40.

Referring to FIG. 5, column content 66 includes node 88 representing an opening and closing tag corresponding to column section 16 of web page 10. Exemplary tags could include, but are not limited to <div>, <p>, and <br>. Tag 88 includes or otherwise encompasses child nodes 90-94. With respect to FIG. 2:

Node 90 corresponds to tags and content 90a for column ad 44;
Node 92 corresponds to tags and content 92a for related links 46; and
Node 94 corresponds to tags and content 94a for columns ad 48.

As noted above, the goal is to extract and publish content from article section 12 excluding content from other sections 14-18. Another goal is to further pare advertisements and other peripheral information from the extracted article content before it is published. To do so, structure 52 shown in FIGS. 3-5, is examined to identify potential article nodes. Article nodes, in the example of FIGS. 1-5 are those nodes that contain content that is part of article section 12. A potential article node is a node having a characteristic indicating a likelihood that the node contains content directly related to the main topic of a web page. In one example, a potential article node is a node containing text of a quantity that exceeds a threshold. That threshold can define a certain number of characters or words. From the identified potential article nodes, the node appearing first in the structure is identified as an article node. Content from the article node and sibling nodes are extracted, merged, and produced. In some cases content, such as advertisements, is excluded.

Figure 6:
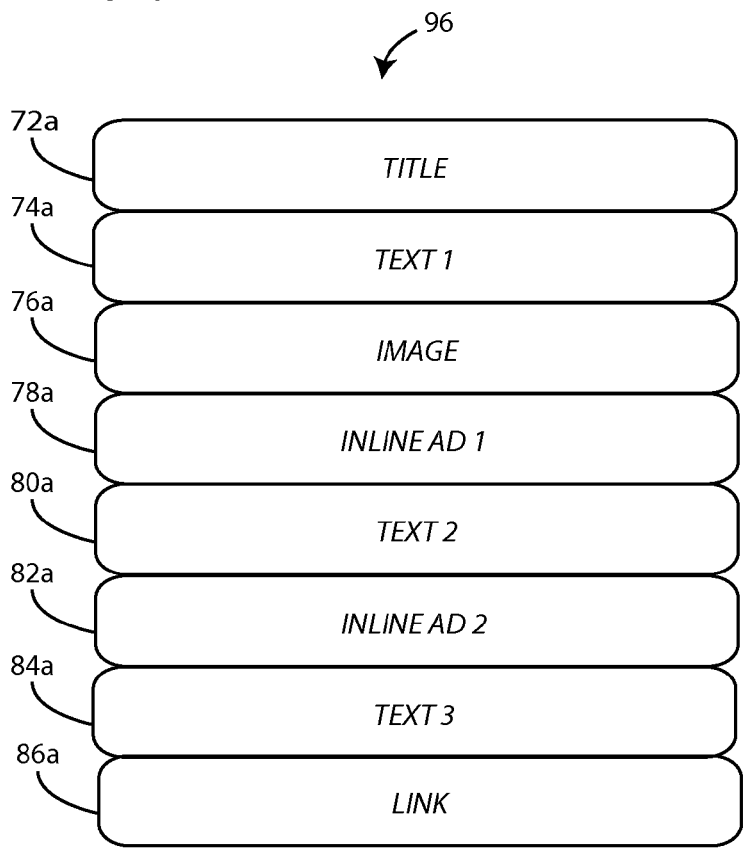
FIG. 6 is an exemplary depiction of extracted content according to an embodiment.

Moving to FIG. 6 while referring back to FIGS. 3-5, presume text 74a of node 74, text 84a of node 84, and related links 92a of node 92 each includes text of a quantity that exceeds the threshold. Thus, each of nodes 74, 84, and 92 would be identified as a potential article node. Within structure 52, node 74 appears first and is thus of the highest rank of the identified potential article nodes. As a consequence, node 74, in this example, is selected as an article node. Nodes 72 and 76-86 are sibling nodes to node 74. In other words, nodes 72 and 76-86 are at the same hierarchical level as node 74 within structure 52.

Content from identified article node 74 and sibling nodes 72 and 76-86 is extracted and merged as depicted by exemplary content structure 96 of FIG. 6. Before producing the content of structure 96, content peripheral to the text of the identified article node 74 is identified and excluded as depicted by exemplary content structure 98 of FIG. 7. Peripheral content can be identified in a number of manners. For example, peripheral content can include a link or an image with the text "advertisement". Peripheral content can be a link with text of a quantity below a threshold value. For example a continuation link to a related page may simply include the word "next" or "continue" or "1" and "2". Thus, in FIG. 7, content 78a, 82a, and 86a has been excluded from structure 98 in FIG. 7.

The content 72a, 74a, 76a, 80a, and 84a of content structure 98 can then be produces as depicted by produced content 100 of FIG. 8. As noted above the extracted content can be produced in a number of manners including printing, displaying on a monitor, communicating via e-mail or web page, and electronically storing in a file. In the example of FIG. 8, produced content 100 includes content directly related to the main topic of web page 10, that is, the topic of article section 12. Excluded from produced content 100 is content from sections 14-18 and peripheral content from section 12.

Extraction System

Figure 10:
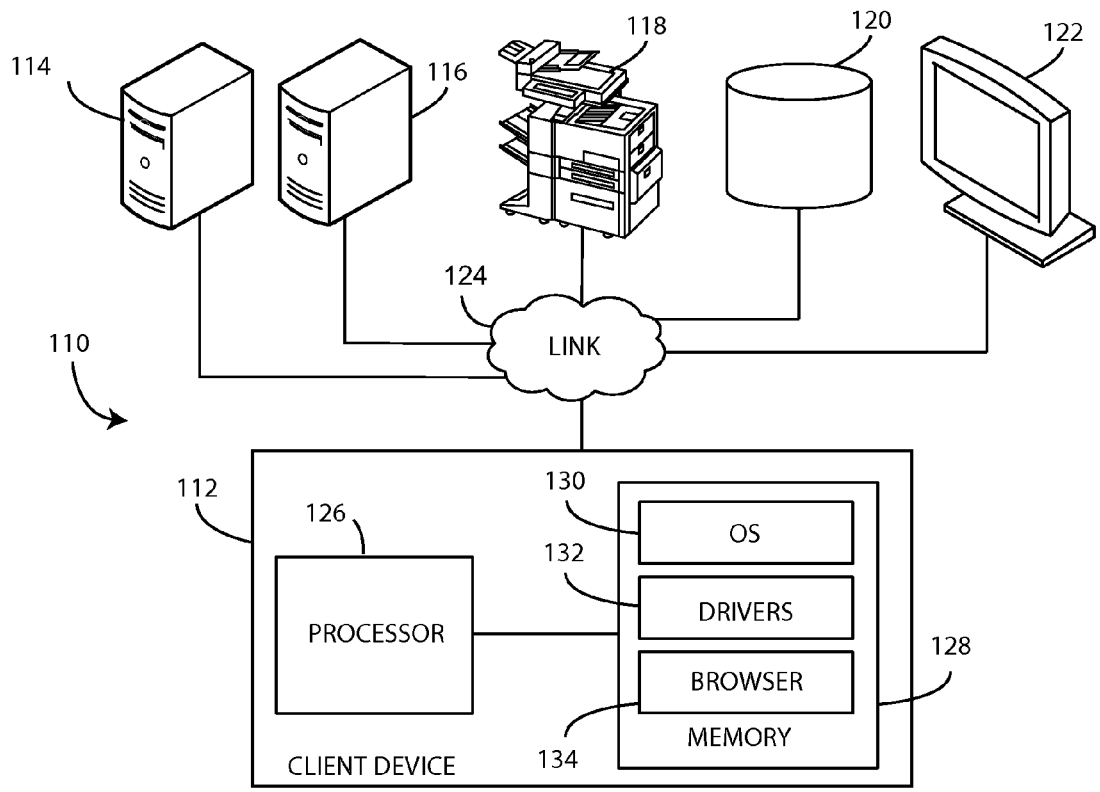
FIG. 10 is an exemplary depiction of an in environment in which the system of claim 9 may be implemented according to an embodiment.

FIGS. 9-10 depict various physical and logical components that function as a system 102 for selectively extracting web content according to an embodiment. System 102 is shown to include structure engine 104, article engine 106, and production engine 108. Structure engine 104 represents generally any combination of hardware and programming capable of detecting, within a web page, a hierarchical structure that includes a plurality of nodes. As noted, such a hierarchical structure can include a DOM (Document Object Model).

Article engine 106 represents generally any combination of hardware and programming capable of identifying potential article nodes from the plurality of nodes of the hierarchical structure. Article engine 106 may perform this task by identifying those nodes containing text of a quantity that exceeds a given threshold such as a number of words or characters. Article engine 106 then identifies, as an article node, the potential article node with the highest rank in the hierarchical structure. Article engine 106 extracts content from the identified article node. Where the identified article node has sibling nodes, those being nodes at the same hierarchical level, article engine 106 extracts the content from those sibling nodes and merges the extracted content. Article engine 106 may also be responsible for excluding content from one or more of the sibling nodes from the merged content. Examining the extracted content, article engine 106 may exclude content from sibling nodes that includes the word "advertisement" or "ad" in conjunction with an image. Article engine 106 may also exclude content from a sibling node that includes text of a quantity that falls below a threshold.

Article engine 106 may also be responsible for determining if a sibling node to the identified article node includes content indicative of the existence of related subsequent web page. A related subsequent web page is a web page having an article node with content that is a continuation of the extracted content of the current web page. As depicted in FIG. 4, a sibling node such as node 86 may include a link with the word "next" or some other indicator that a subsequent web page contains content related to the extracted content. Thus, article engine 106 may examine the sibling nodes for content that includes a link and the word "next" or "1" and "2" or "continue." Upon detection of such content, structure engine 104 detects, within a web page referenced by that link, a hierarchical structure that includes a plurality of nodes. Examining that new plurality of nodes, article engine 106 extracts content in the manner previously described, appending the newly extracted content to the content previously extracted. This process can repeat until article engine 106 no longer finds an indication of a related subsequent web page.

Production engine 108 represents generally any combination of hardware and programming capable of producing the extracted and merged content. As noted above the extracted content can be produced in a number of manners including printing, displaying on a monitor, communicating via e-mail or web page, and electronically storing in a file.

System 102 of FIG. 9 may be implemented in a number of environments such as environment 110 of FIG. 10. Environment 110 includes client device 112, server devices 114 and 116, printer 118, data repository 122, and display device 124. Client device represents generally any computing device capable of obtaining and processing web content. For example, client device 112 may be a desktop computer, a laptop computer, a smart phone. Server device 114 represents generally any computing device or devices capable of serving web pages to client device 112. Server device 116 represents generally any computing device or devices capable of serving remote applications to client device 112. Printer 118 represents generally any image forming device capable of producing printed images. Data repository represents generally any service capable of storing electronic data for later retrieval and use. Display device 124 represents generally any device such as a computer monitor or television capable of displaying desired images.

Link 124 interconnects client device 112 with devices 114-122, Link 124 represents generally one or more of a cable, wireless, fiber optic, or remote connection via a telecommunication link, an infrared link, a radio frequency link, or any other connector or system that provides electronic communication. Link 124 may represent an intranet, the Internet, or a combination of both. The paths followed by link 124 between client device 112 and devices 114-122 as depicted in FIG. 10, represent the logical communication paths between these devices, not necessarily the physical paths between the devices.

In the example of FIG. 10, client device 112 includes processor 126 and memory 128. Processor 60 represents generally any device capable of executing program instructions stored in memory 130. Memory 130 represents generally any memory configured to store program instructions that, when executed, cause processor 128 to selectively extract web content from a web page or cause processor 128 to request that a remote application executed by server device 116 do the same.

Memory 130 is shown to include OS (operating System) 130, drivers 132, and browser 134. OS 130 represents generally any software platform on top of which other programs or applications such as drivers 132 and browser 134 run. Examples include Linux® and Microsoft Windows®, Drivers 132 represent generally any program instructions that when executed control the operation of printer 118, data repository 120, and display device 122. In particular drivers 132 serve and translators for OS 130 and browser 134. Drivers 132 translate generic commands received from OS 130 and browser 134 into device specific commands capable of being utilized by peripheral devices 118, 120, and 122. Browser 134 represents generally any program instructions that when executed operate to retrieve a web page from server device 114 through use of drivers 132 operate to cause a display of the web page and print the web page.

As noted above, the various components of system 102 of FIG. 9 include combinations of hardware and programming. With respect to FIG. 10, the hardware components may be implemented though processor 126 and for server device 116. The programming elements may be implemented as parts of OS 130, drivers 132, browser 134, and/or programming executed by server device 116.

Operation

Figure 11:
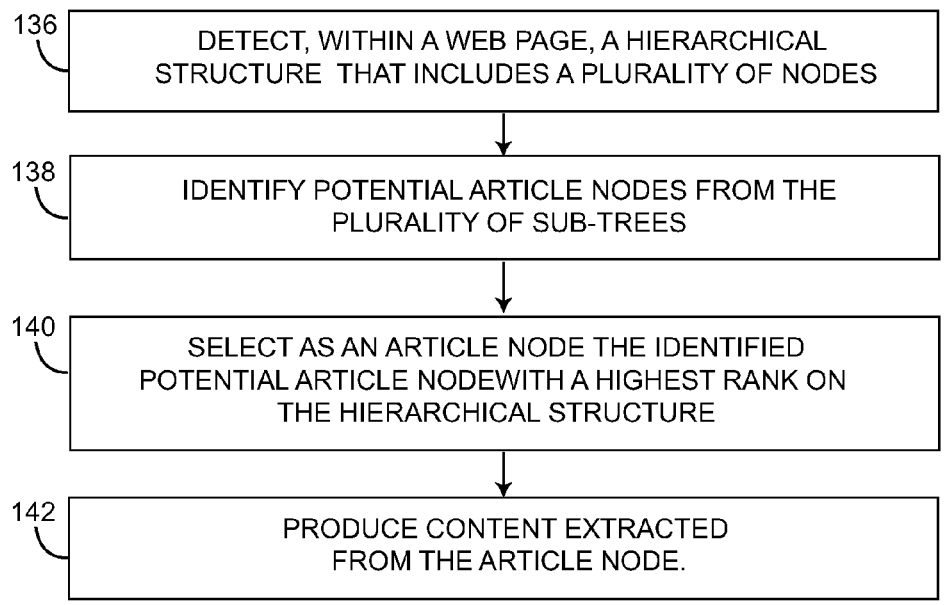
FIGS. 11 and 12 are flow diagrams depicting steps take to implement various embodiments.
Figure 12:
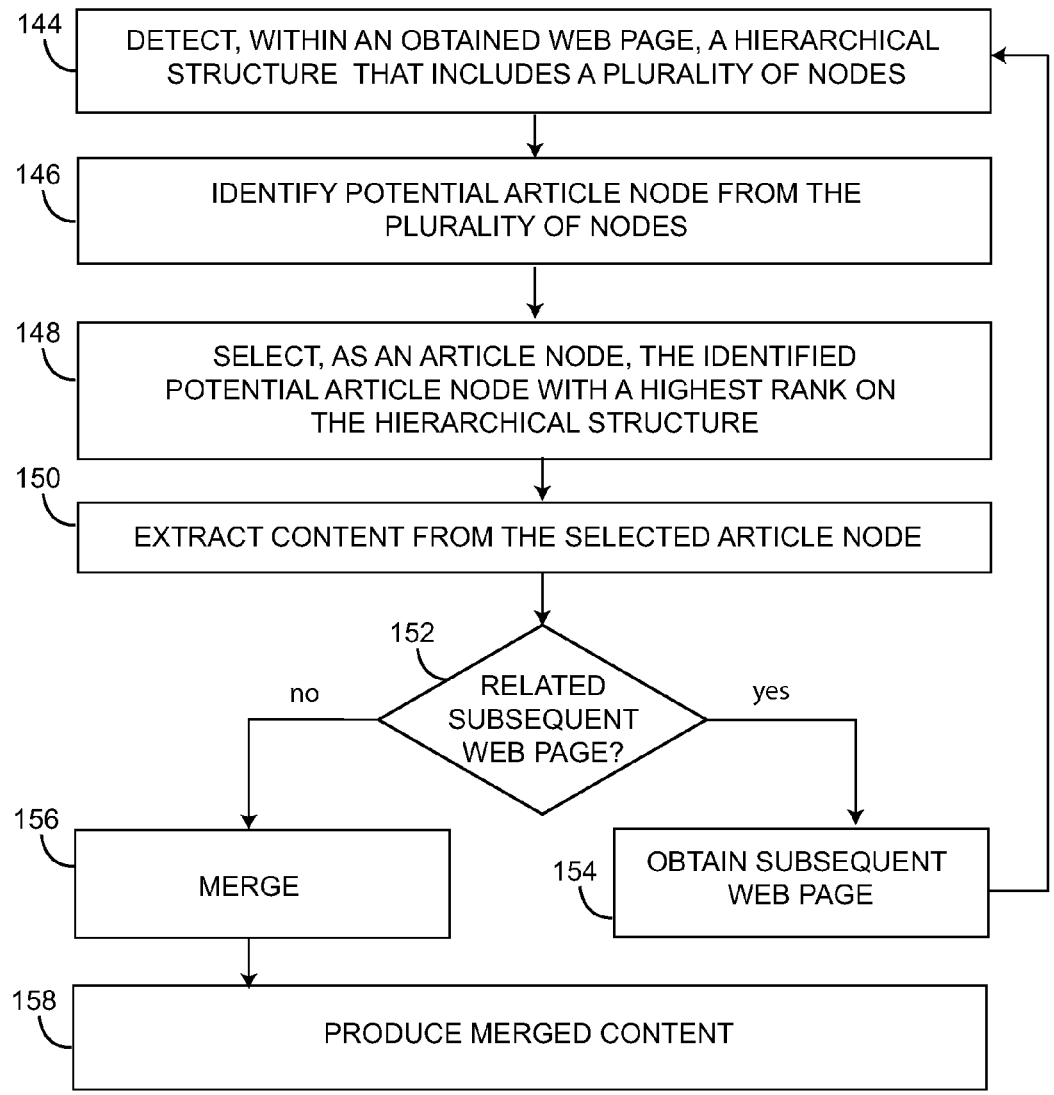

FIGS. 11-12 are exemplary flow diagrams of steps taken to implement various embodiments. In discussing FIGS. 11-12, reference is made to the diagrams of FIGS. 2-10 to provide contextual examples. Implementation, however, is not limited to those examples. Starting with FIG. 11, a hierarchical structure is detected within a web page (step 136). That structure includes a plurality of hierarchically organized nodes. In a given example, the structure is a DOM (Document Object Model) as depicted in the examples of FIGS. 3-5. In the example of FIG. 9, structure engine 104 is responsible for implementing step 136. Referring to FIG. 10, structure engine 104 may be implemented, at least in part, via OS 130, drivers 132, browser 134, or even programming being executed by server device 116.

Potential article nodes are identified from the plurality of nodes of the structure detected in step 136 (step 138). In doing so, the plurality of nodes are examined to identify those nodes with characteristics indicating a likelihood that the nodes contain content directly related to the main topic of a web page. Such a characteristic can include a quantity of text that exceeds a threshold number of words or characters. The potential article node having the highest rank—that is, the potential article node that appears first—within the structure is selected as an article node (step 140). Referring to FIG. 9, article engine 106 is responsible for implementing steps 138 and 140. Referring to FIG. 10, article engine 106 may be implemented, at least in part, via OS 130, drivers 132, browser 134, or even programming being executed by server device 116.

Content from the selected article node is produced (step 142). Producing can include printing, displaying, communicating via an electronic message, posting to a web site, and saving to a file. Referring to FIG. 9, production engine 108 is responsible for implementing steps 138 and 140. Referring to FIG. 10, production engine 108 may be implemented, at least in part, via OS 130, drivers 132, browser 134, or even programming being executed by server device 116.

The article node selected in step 140 may not include all of the article content. In such a case, sibling nodes to the selected article node are identified. Content from the selected article node is merged with content extracted from those sibling nodes, and the merged content is produced in step 142. Some of the sibling nodes, however, may include content such as advertisements and links that is peripheral to the topic of the article content. Before producing the merged content, those sibling nodes are identified that include one or more of advertisement content and text content of a quantity below a threshold. Sibling nodes containing advertising content may, for example, be identified by searching for a note that includes word "advertisement" or "ad" or a variation thereof and little if any other text. Content from such identified sibling node or nodes is excluded from the merged content.

Moving to FIG. 12, a hierarchical structure is detected within an obtained web page (step 144). That structure includes a plurality of hierarchically organized nodes. In a given example, the structure is a DOM (Document Object Model) as depicted in the examples of FIGS. 3-5. In the example of FIG. 9, structure engine 104 is responsible for implementing step 144. Referring to FIG. 10, structure engine 104 may be implemented, at least in part, via OS 130, drivers 132, browser 134, or even programming being executed by server device 116.

Potential article nodes are identified from the plurality of nodes of the structure detected in step 144 (step 146). In doing so, the plurality of nodes are examined to identify those nodes with characteristics indicating a likelihood that the nodes contain content directly related to the main topic of a web page. Such a characteristic can include a quantity of text that exceeds a threshold number of words or characters. The potential article node having the highest rank—that is, the potential article node that appears first—within the structure detected in step 144 is selected as an article node (step 148). Content is extracted from the selected article node (step 150).

It is determined if a related subsequent web page exists (step 152). Such a web page contains content that is a continuation of the content of the selected article node. A sibling node may include a link with the word "next" or some other indicator that a subsequent web page contains content related to the content of the selected article node. Thus, article engine 106 may, in step 152, examine sibling nodes of the selected article node for content that includes a link and the word "next" or "continue." or "1" and "2". Upon a positive determination in step 152, the subsequent web page is obtained (step 154) and the process skips back to step 144. In such a case content can be extracted from a selected article node each time step 150 is repeated. Upon a negative determination in step 152, the process continues on to step 156 where the content extracted in step 150 from one or more article nodes selected in step 148 is merged. Referring to FIG. 9, article engine 106 is responsible for implementing steps 146-156. Referring to FIG. 10, article engine 106 may be implemented, at least in part, via OS 130, drivers 132, browser 134, or even programming being executed by server device 116.

The merged content is then produced (step 142). Producing can include printing, displaying, communicating via an electronic message, posting to a web site, and saving to a file. Referring to FIG. 9, production engine 108 is responsible for implementing steps 138 and 140. Referring to FIG. 10, production engine 108 may be implemented, at least in part, via OS 130, drivers 132, browser 134, or even programming being executed by server device 116.

The article node or nodes selected in step 140 may not include all of the article content. In such a case, sibling nodes to the selected article node are identified. Content from those sibling nodes is extracted in step 150 and merged in step 156. Some of the sibling nodes, however, may include content such as advertisements and links that is peripheral to the topic of the article content. Before producing the merged content, those sibling nodes are identified that include one or more of advertisement content and text content of a quantity below a threshold. Sibling nodes containing advertising content may, for example, be identified by searching for a note that includes word "advertisement" or a variation thereof and little if any other text. Content from such identified sibling node or nodes is excluded from the merged content of step 156.

CONCLUSION

The diagrams of FIGS. 1-8 are used to depict selective content extraction with respect to an exemplary web page. Implementation, however, is not limited. FIGS. 9-10 show the architecture, functionality, and operation of various embodiments. Various components illustrated in FIGS. 9-10 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 11-12 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for extracting web content, comprising:
  detecting, within a first web page, a hierarchical structure of the first web page that includes a first plurality of nodes;
  identifying potential first article nodes from the first plurality of nodes, wherein the potential first article nodes include a plurality of nodes that correspond to an article section of the first web page;
selecting as a first article node one of the identified potential first article nodes that appears first in the hierarchical structure of the first web page, wherein the first article node corresponds to content of an article of the article section of the first webpage;
selecting a number of sibling article nodes at a same level in the hierarchical structure of the first web page as the first article node, wherein the number of sibling article nodes include additional content of the article of the first article node;
extracting content from the first article node and the number of sibling nodes;
identifying a link specifying a second web page within a sibling node of the number of sibling nodes, wherein the link is indicative that the second web page includes a continuation of the content of the article of the article section of the first webpage;
detecting, responsive to identifying the link, a hierarchical structure of the second web page specified by the link that includes a second plurality of nodes;
identifying potential second article nodes from the second plurality of nodes, wherein the potential second article nodes include a plurality of nodes that correspond to an article section of the second web page;
selecting as the second article node the identified potential article node that appears first in the hierarchical structure of the second webpage;
extracting content from the second article node;
merging the content extracted from the second article node with the content from the first article node and the number of sibling article nodes; and
producing the merged content.

2. The method of claim 1, further comprising:
identifying a sibling node at the same hierarchical level as the first article node that contains one or more of advertisement content and text content of a quantity below a threshold value, and
excluding content from the identified sibling node from the merged content.

3. The method of claim 1, wherein identifying potential first article nodes comprises identifying one or more of the first plurality of nodes that contain text content of a quantity that exceeds a threshold.

4. A non-transitory computer readable medium having computer executable instructions stored thereon, the instructions wherein executed by a processor cause a processing system to implement a method that includes:
detecting, within a first web page, a hierarchical structure of the first web page that includes a first plurality of nodes;
identifying potential first article nodes from the first plurality of nodes, wherein the potential first article nodes include a plurality of nodes that correspond to an article section of the first web page;
selecting as a first article node the identified potential first article nodes that appears first in the hierarchical structure of the first web page, wherein the first article node corresponds to content of an article of the article section of the first web page;
selecting a number of sibling article nodes at a same level as the first article node in the hierarchical structure of the first web page, wherein the number of sibling article nodes include additional content of the article of the first article node;
extracting content from the first article node and the number of sibling nodes;
identifying a link specifying a second web page within a sibling node of the number of sibling nodes, wherein the link is indicative that the second web page includes a continuation of the content of the article of the article section of the first webpage;
detecting, responsive to identifying the link, a hierarchical structure of the second web page specified by the link that includes a second plurality of nodes;
identifying potential second article nodes from the second plurality of nodes, wherein the potential second article nodes include a plurality of nodes that correspond to an article section of the second web page;
selecting as the second article node the identified potential article node that appears first in the hierarchical structure of the second webpage;
extracting content from the second article node;
merging the content extracted from the second article node with the content extracted from the first article node and the number of sibling article nodes; and
producing the merged content.

5. The medium of claim 4, wherein the method includes:
identifying a sibling node at the same hierarchical level as the first article node that contains content peripheral to text of the first article node, and
excluding content from the identified node from the merged content.

6. The medium of claim 5, wherein the method includes:
identifying, within the second web page and any subsequently linked web pages, links that specify additional web pages that include continuing content of the article of the article section of the first webpage until no further links can be identified.

7. A system for extracting web content, comprising:
a structure engine operable to detect, within a first web page, a hierarchical structure of the first webpage that includes a first plurality of nodes;
an article engine operable to:
identify potential first article nodes from the first plurality of nodes, wherein the potential first article nodes include a plurality of nodes that correspond to an article section of the first web page,
select as a first article node the identified potential first article node that appears first in the hierarchical structure of the first web page, wherein the first article node corresponds to content of an article of the article section of the first webpage,
select a number of sibling article nodes at a same level as the first article node in the hierarchical structure of the first web page, wherein the number of sibling article nodes include additional content of the article of the first article node,
extract content from the first article node and the number of sibling nodes,
identify a link specifying a second web page within a sibling node of the number of sibling nodes, wherein the link is indicative that the second web page includes a continuation of the content of the article of the article section of the first webpage,
detect, responsive to a positive identification, a hierarchical structure of the second web page specified by the link that includes a second plurality of nodes,
identify potential second article nodes from the second plurality of nodes, wherein the potential second article nodes include a plurality of nodes that correspond to an article section of the second web page, select as the second article node the identified potential article node that appears first in the hierarchical structure of the second webpage, extract content from the second article node, merge the content extracted from the second article node with content extracted from the first article node and the number of sibling article nodes; and a production engine operable to produce the merged content.

8. The system of claim 7, wherein the article engine is operable to:

identify a sibling node at the same hierarchical level of the first web page as the first article node that contains a variation of the word "advertisement" in conjunction with an image, and exclude content from the identified node from the merged content.

9. The system of claim 8, wherein the article engine is operable to:

select a number of sibling article nodes at a same level as the second article node in the hierarchical structure of the second web page, wherein the number of sibling article nodes include additional content of the article of the first article node;

extracting content from the second number of sibling nodes; and merging the content extracted from the second number of sibling nodes with the content extracted from the second article node.

* * * * *

UNITED STATES PATENT AND TRADEMARK OFFICE
CERTIFICATE OF CORRECTION

PATENT NO.        : 9,032,285 B2                                    Page 1 of 1
APPLICATION NO.   : 13/378153
DATED             : May 12, 2015
INVENTOR(S)       : Sam Liu et al.

It is certified that error appears in the above-identified patent and that said Letters Patent is hereby corrected as shown below:

IN THE DRAWINGS

In sheet 5 of 6, reference numeral 140, line 2, delete "NODEWITH" and insert -- NODE WITH --, therefor.

Signed and Sealed this
Third Day of November, 2015

Michelle K. Lee
*Director of the United States Patent and Trademark Office*